No. 719,898. PATENTED FEB. 3, 1903.
G. K. SPITZENBERG.
CULTIVATOR.
APPLICATION FILED SEPT. 27, 1901.
NO MODEL. 2 SHEETS—SHEET 2.

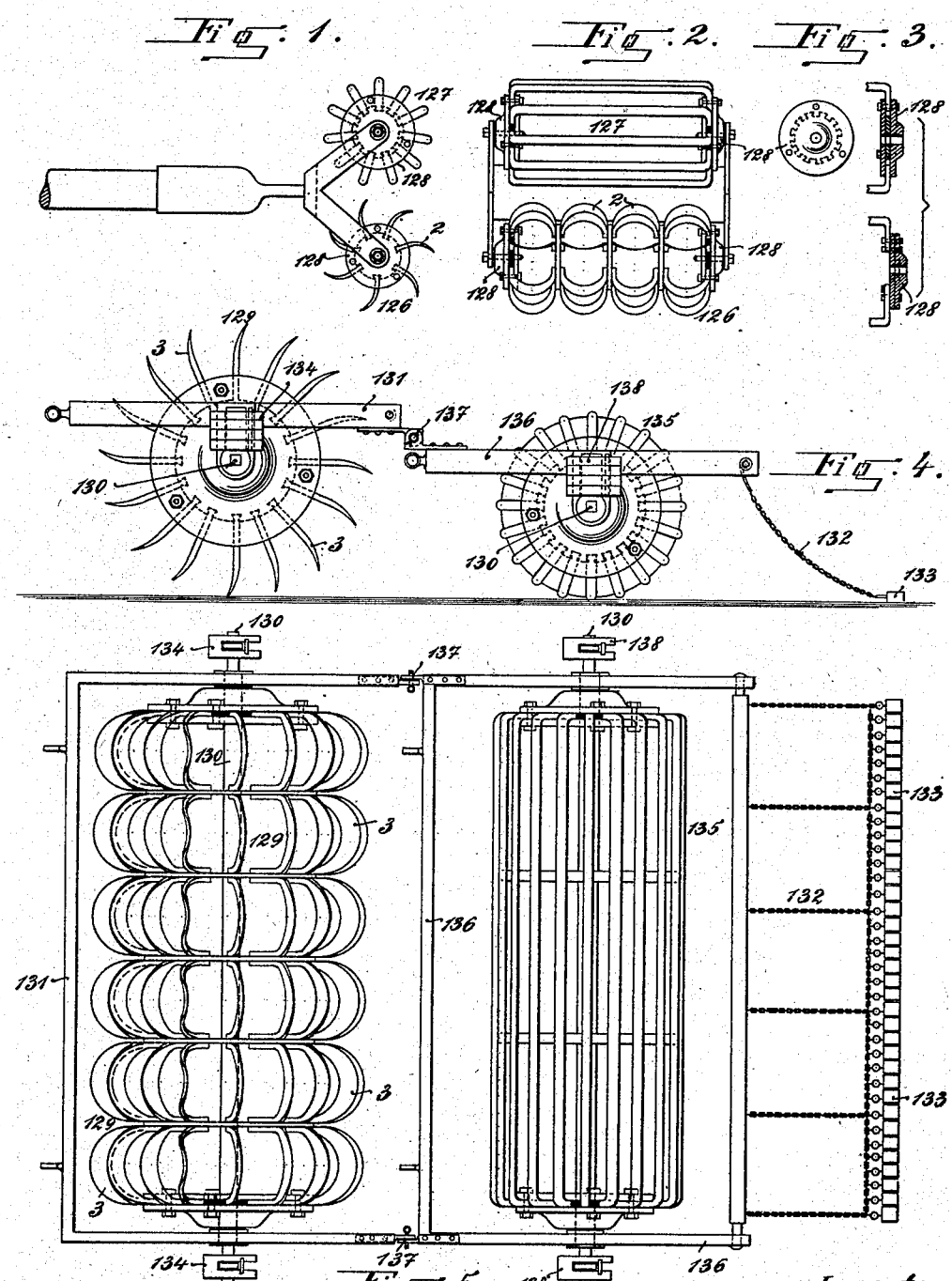

Witnesses:
W. M. Avery
R. B. Cavanagh

Inventor
George K. Spitzenberg
per
Attorneys

UNITED STATES PATENT OFFICE.

GEORG KARL SPITZENBERG, OF FORSTHAUS LINZMÜHLE, NEAR PFAFFENDORF, GERMANY.

CULTIVATOR.

SPECIFICATION forming part of Letters Patent No. 719,898, dated February 3, 1903.

Application filed September 27, 1901. Serial No. 76,819. (No model.)

*To all whom it may concern:*

Be it known that I, GEORG KARL SPITZENBERG, a subject of the Emperor of Germany, and a resident of Forsthaus Linzmühle, near Pfaffendorf, in the Province of Brandenburg, Germany, have invented certain new and useful Improvements in Cultivators, of which the following is a full, clear, and exact description.

The present invention relates to implements for cultivating land which apply primarily to forestry, but also to agriculture and horticulture.

In using the implements constructed according to the present invention the soil to be treated is loosened and mixed to the required depth by means of rotarily-moving knives or blades without reversing the layers of soil in such a manner that (in forest soil) the humus or vegetable soil will naturally be most plentiful on top and no sharply-defined line will exist between loosened and unloosened soil, suitable pressure being thereafter brought to bear on the loosened soil and the latter being finally covered with a fine loose granulated layer.

In the annexed drawings the implements referred to are represented in several forms of construction.

Figure 8:
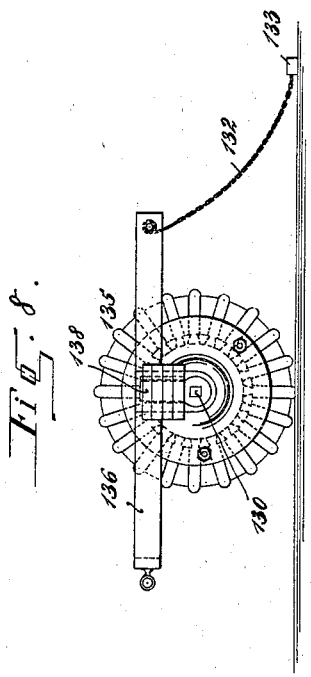
Figure 9:
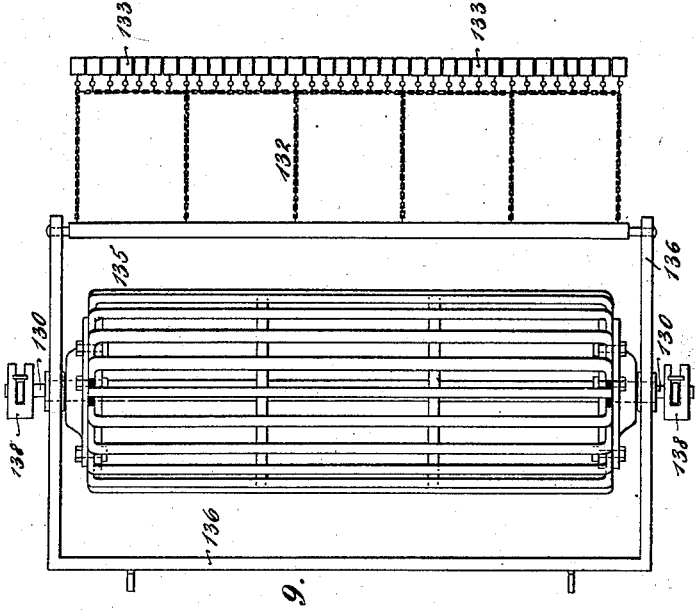
Figure 6:
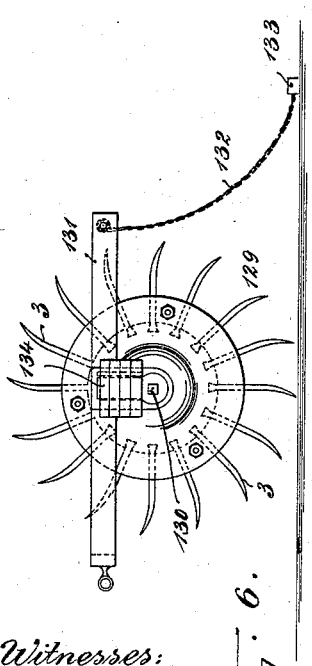
Figure 7:
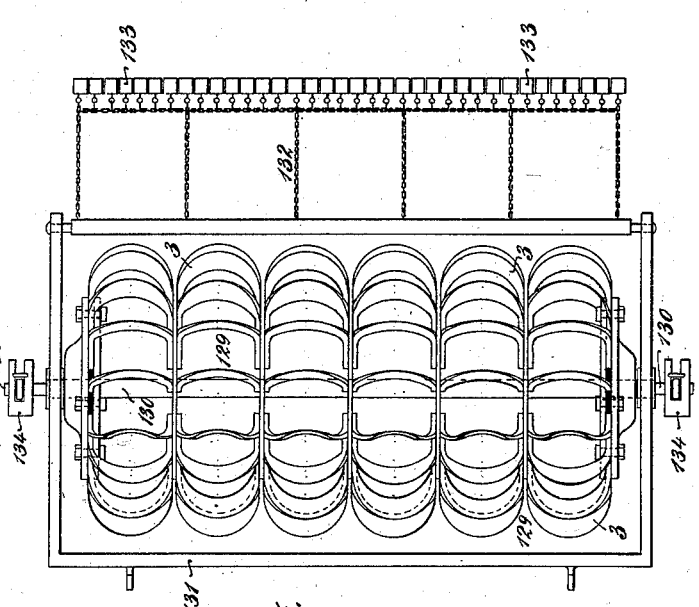

Figures 1 to 3 represent a hand implement for loosening the soil, Fig. 1 being a front view, and Fig. 2 an end view, of the implement, and Fig. 3 showing detail views of the exchangeable bearing-plates of the implement. Figs. 4 and 5 represent a combined vehicular apparatus serving both for loosening the soil and placing the seed, Fig. 4 being a side view, and Fig. 5 a plan view, of this apparatus. Figs. 6 to 9 represent forms of the apparatus shown in Figs. 4 and 5 intended more particularly for field culture, Figs. 6 and 8 being side views, Figs. 7 and 9 being plan views, of this vehicular apparatus.

In the following description the cultivating apparatus, which are applicable to forestry, agriculture, and horticulture, will be more particularly treated as applied to forest cultivation. Since in forest cultivation the soil is generally only loosened in parts, any existing crustation is first removed from such parts by means of the apparatus for that purpose by hoeing or plowing to the smallest possible depth.

Figs. 1 and 2 represent a hand implement for use in cultivation from seeds, called a "trellis-rake," which serves to prepare the soil, place the seed, and press down the seed-bed. The drum 126, formed by series of bent knives or blades 2, and the trellis-drum 127, formed by longitudinal bars, are arranged, twin-like, one above the other. Both rollers 126 and 127 are provided with exchangeable bearing-plates 128 in order that the bearings may easily be replaced when worn out. By means of the roller 126 the soil is loosened and prepared and in some cases also pressed down—for instance, when a thick covering is desired. By means of the roller 127 only shallow placing is effected and the seed is commingled with the soil, the latter being also pressed down and a granular surface layer produced. Fig. 3 represents two different methods of fastening the trellis-bars and the arrangement of the bearing-plates 128.

A modification of the trellis-rake is constructed as a vehicular apparatus principally for use in field cultivation, as shown in Figs. 4 and 5. In this vehicular apparatus the knife-drum 129, provided with the transverse knives 3, has the form of a so-called "revolving" harrow. The axle 130 of this drum 129, which is also provided with exchangeable bearing-plates, has bearings in the frame 131, which is connected to the frame 136 of the trellis-roller 135 by means of links 137. To the rear of the frame 136 a drag 132 may be attached. The latter consists of a suspended slide with movable members 133 and serves to raze elevations of the soil which have been produced and to produce a loose layer of granular earth. Above the shaft on both sides weights 134 and 138 may be attached to the frames 131 and 136, respectively. These weights may be of any suitable size and suitable number of them may be provided. After loosening the links 137 the knife-drum or revolving harrow 129 and the trellis-roller 135 may be used separately for cultivating purposes, as illustrated by Figs. 6 to 9.

What I claim, and desire to secure by Letters Patent, is—

1. A cultivator, comprising a roller formed by transverse knives and a trellis-roller connected therewith.

2. A cultivator, comprising a trellis-roller provided with exchangeable bearing-plates and a roller formed by transverse knives and also provided with exchangeable bearing-plates.

3. A cultivator, comprising a knife-roller, a trellis-roller connected therewith and a detachable drag arranged at the rear.

4. A cultivator, comprising a knife-roller and a trellis-roller, the frames of both rollers being removably connected by suitable means, and a drag arranged at the rear of the frames.

5. In a cultivator, the combination of a frame, a roller provided with knives, journaled in said frame, a trellis-roller, a drag at the rear of the frame, said drag being formed of a series of movable members, and weights for said frame.

Dated this 14th day of September, 1901.

GEORG KARL SPITZENBERG.

Witnesses:
HENRY HASPER,
WOLDEMAR HAUPT.